(12) United States Patent
Xiao et al.

(10) Patent No.: US 9,893,541 B2
(45) Date of Patent: Feb. 13, 2018

(54) CHARGER WITH HUB

(71) Applicants: AMBIT MICROSYSTEMS (SHANGHAI) LTD., Shanghai (CN); HON HAI PRECISION INDUSTRY CO., LTD., New Taipei (TW)

(72) Inventors: Jian-Feng Xiao, Shanghai (CN); Bin Huang, Shenzhen (CN)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 970 days.

(21) Appl. No.: 14/251,235

(22) Filed: Apr. 11, 2014

(65) Prior Publication Data
US 2014/0340029 A1 Nov. 20, 2014

(30) Foreign Application Priority Data
May 14, 2013 (CN) ...................... 2013 2 0259963 U

(51) Int. Cl.
*H02J 7/00* (2006.01)
(52) U.S. Cl.
CPC .................. *H02J 7/0044* (2013.01)
(58) Field of Classification Search
USPC ....................................................... 320/107
See application file for complete search history.

(56) References Cited

U.S. PATENT DOCUMENTS

| 7,689,197 B2* | 3/2010 | Laude ................ G11B 17/0405 |
| | | 181/198 |
| 2013/0093386 A1* | 4/2013 | Tsai ........................ H02J 5/005 |
| | | 320/108 |

FOREIGN PATENT DOCUMENTS

| CN | 201426125 | 3/2010 |
| CN | 10740970 | 6/2010 |

* cited by examiner

*Primary Examiner* — Eric Lee
(74) *Attorney, Agent, or Firm* — ScienBiziP, P.C.

(57) ABSTRACT

A charger includes a charging unit and a hub unit. The charging unit includes an enclosure, a charging circuit and two wires. The enclosure defines a matching groove. Opposite sidewalls of the matching groove separately define a limiting groove. The hub unit includes a foundation, a circuit unit, a locking protrusion, a pair of bolts and a pair of hook assemblies. The foundation defines a holder. The locking protrusion, the bolts and the latching members are all received in the holder. One end of each of the two wires is electrically coupled to the charging circuit, and the other end of each of the two wires extends through the matching groove and the receiving groove in that order and electrically couples to the circuit unit.

10 Claims, 5 Drawing Sheets

CHARGER WITH HUB

BACKGROUND

1. Technical Field

The present disclosure generally relates to chargers, more particularly to a charger with a charger unit and a hub unit matched with the charger unit.

2. Description of Related Art

Cordless telephones are widely used. A cordless telephone includes a host, an auxiliary machine and a hub for a connection between the host and the auxiliary machine. A rechargeable battery is usually set in the auxiliary machine. Thus, two chargers must be available, one for the hub and the other one for auxiliary machine, which leads to high cost.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
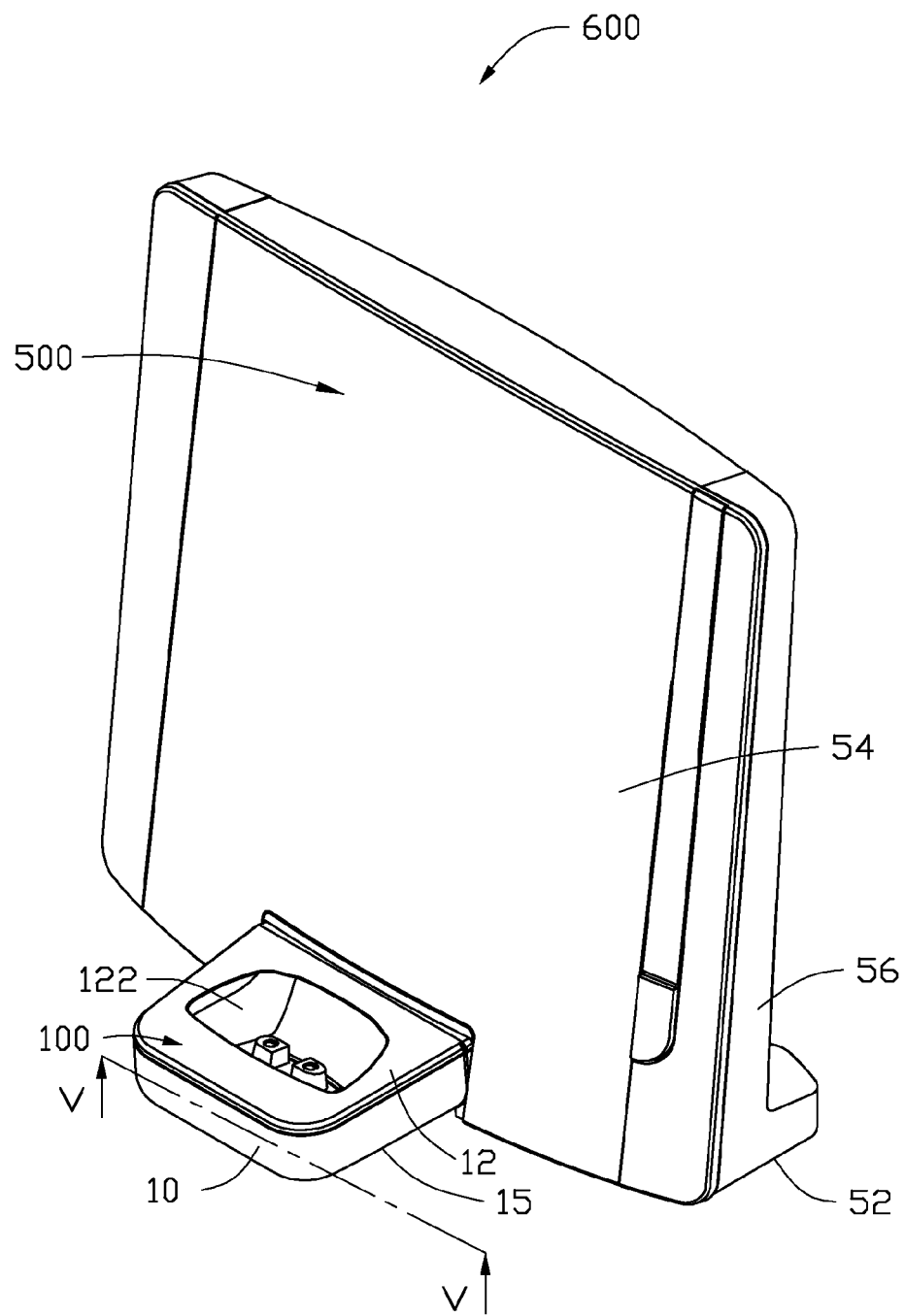
FIG. 1 is a perspective view of a charger with a charger unit and a hub unit of the disclosure.
Figure 2:
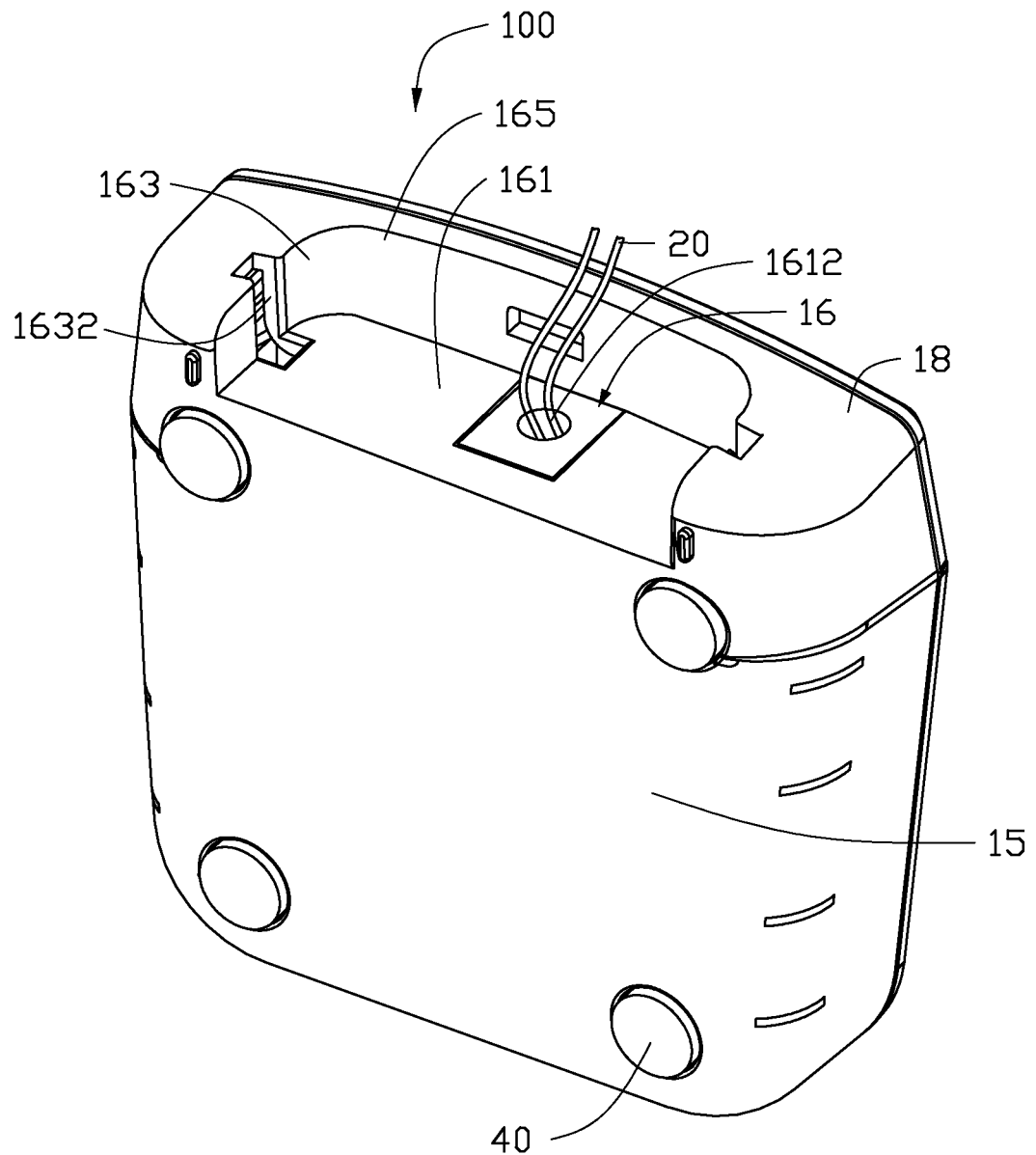
FIG. 2 is a perspective view of the charger unit of the charger of FIG. 1.

FIG. 1 and FIG. 2 show that a charger 600 including a charger unit 100 and a hub unit 500 electrically coupled to the charger unit 100. The charger unit 100 can charge an electronic device (not shown) when the hub unit 500 is powered. The hub unit 500 can be used for receiving and/or sending wireless signals to the electronic device. In other embodiments, the electronic device can be a cordless telephone or a mobile phone, but the disclosure is not limited thereto.

The charger includes an enclosure 10, a charging circuit (not shown) received in the enclosure 10, two wires 20 extending out of the enclosure 10 and electrically coupled to the charging circuit, and a plurality of supporting seats 40 of the charger.

The enclosure 10 includes a first surface 12, a second surface 15 opposite to the first surface 12 and a sidewall 18 connected with the first surface 12 and the second surface 15. The first surface 12 defines a fitting groove 122 for fitting the electronic device. A matching groove 16 is located at a connection of the second surface 15 and the sidewall 18. The matching groove 16 includes a floor 161, a pair of opposite first sidewalls 163 and a second sidewall 165 connected with the first sidewalls 163. A first through hole 1612 is defined on a central section of the floor 161. The two wires 20 extend through the first through hole 1612. Both of the pair of first sidewalls 163 define slots 1632. The slots 1632 pass through the sidewall 18 and the floor 161.

Four supporting seats 40 are located at four corners of the second surface 15 for supporting the charger unit 100. Alternatively, quantities of the supporting seat 40 can be changed according to different requirements.

Figure 3:
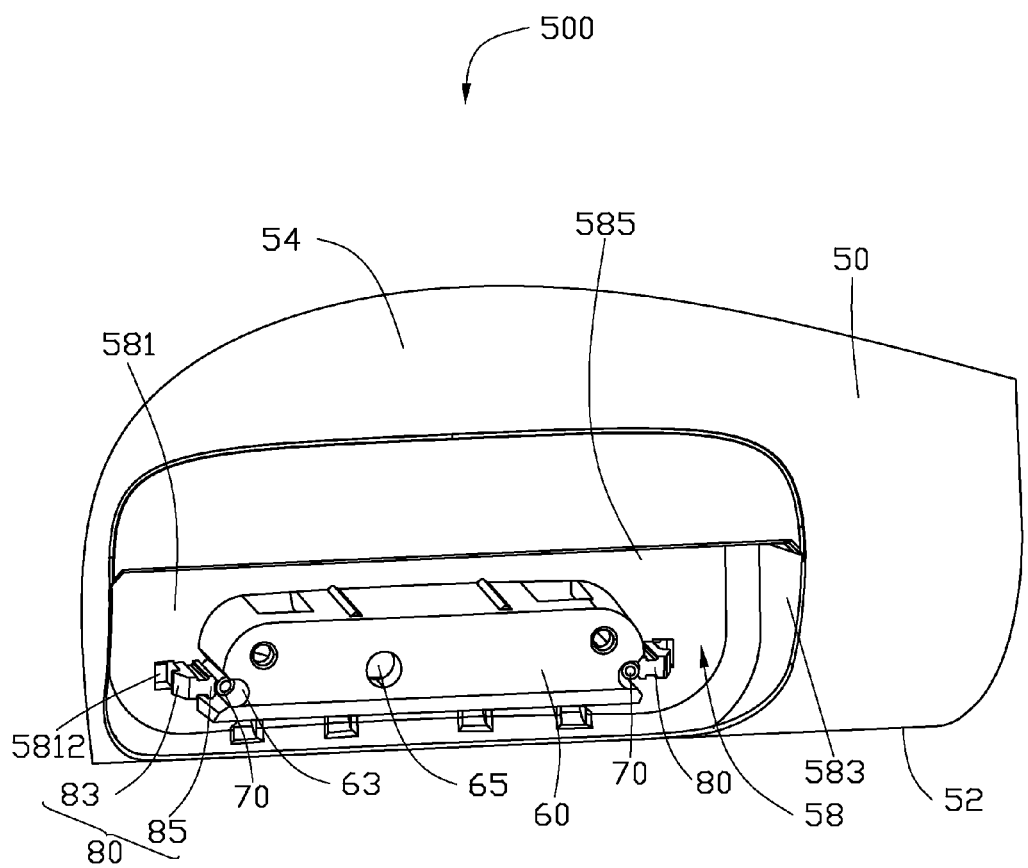
FIG. 3 is a cross-sectional perspective view of a hub unit of the charger of FIG. 1.
Figure 4:
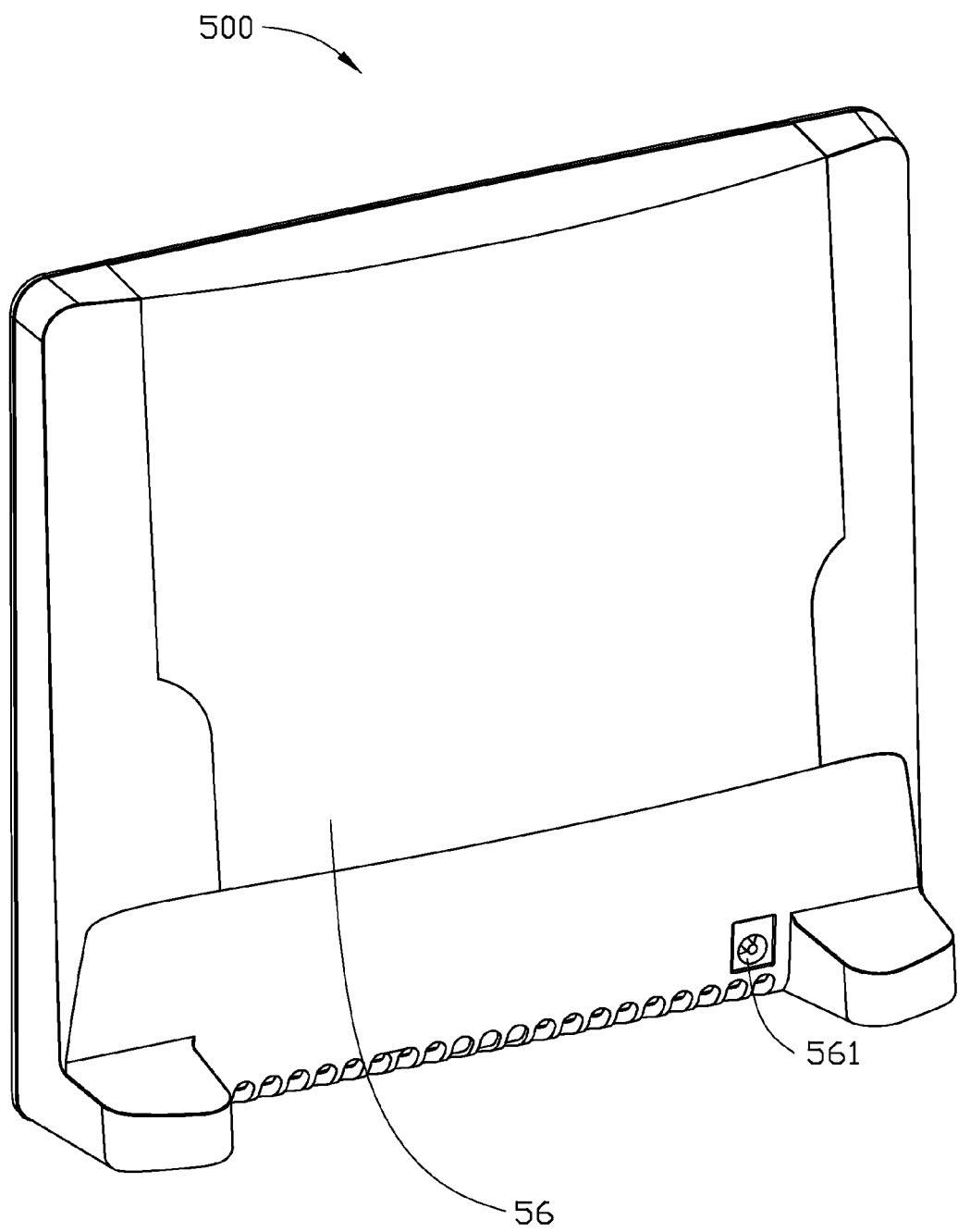
FIG. 4 is another perspective view of the hub unit of the charger of FIG. 1.
Figure 5:
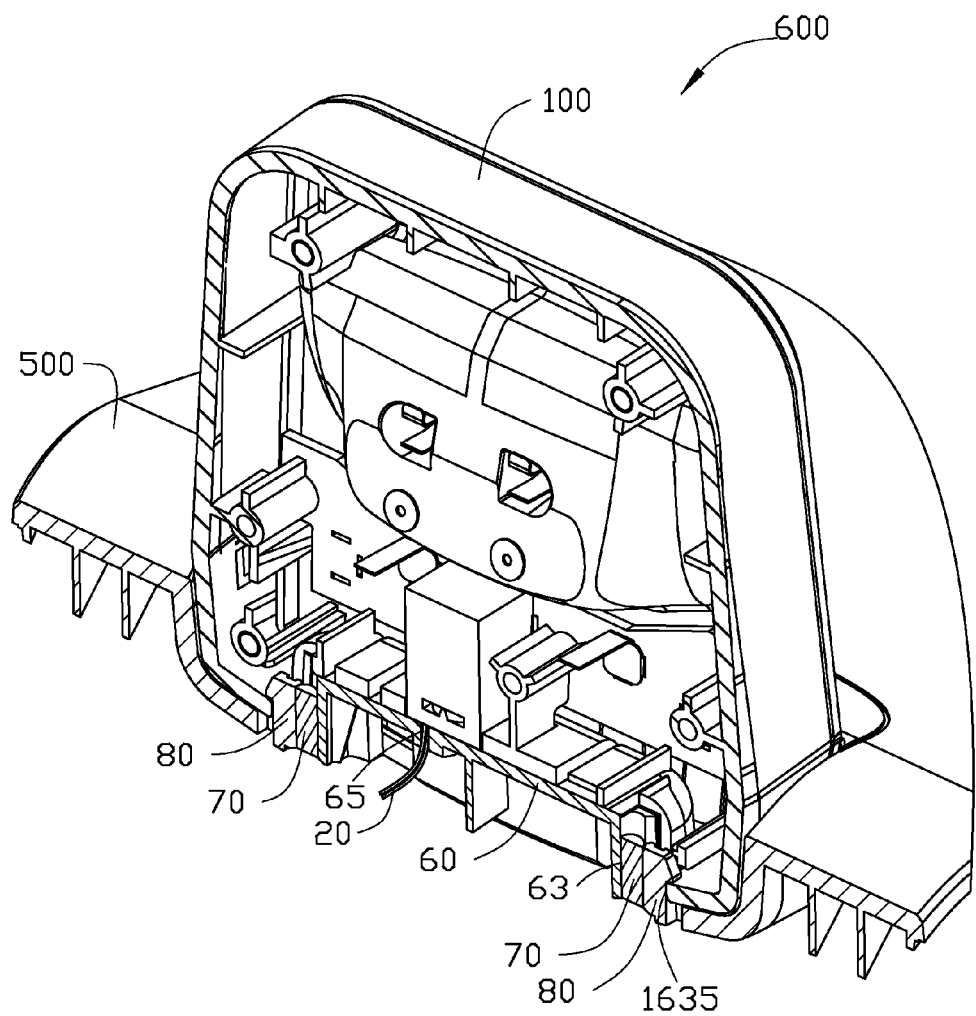
FIG. 5 is a cross sectional view taken along line V-V of the charger unit and the hub unit matched with the charger unit of FIG. 1.

FIG. 3 and FIG. 4 show that the hub unit 500 includes a foundation 50, a circuit unit (not shown) received in the foundation 50, an antenna (not shown) coupled to the circuit unit for receiving signals, a locking protrusion 60 mounted in the foundation 50, a pair of bolts 70 and a pair of elastic latching members 80.

The foundation 50 includes a base side 52, a first side 54 and a second side 56 opposite to the first side 54. The base side 52 is connected with the first side 54 and the second side 56. A holder 58 is concavely located at a connection of the base side 52 and the first side 54. The holder 58 includes a bottom 581 substantially parallel to the first side 54, a pair of opposite first lateral walls 583 perpendicular with the bottom 581 and a second lateral wall 585 connected with the pair of first lateral walls 583. The bottom 58 defines a pair of fixing holes 5812. The second side 56 defines a jack 561 connecting to a power source.

The locking protrusion 60 can be cuboidal and extend from a central section of the bottom 581 of the holder 58 and toward the first side 54. A pair of fixing grooves 63, perpendicular with the bottom 581 are respectively located at two opposite sides of the locking protrusion 60. The pair of fixing grooves 63 pass through the bottom 581. The locking protrusion 60 defines a second through hole 65 perpendicular with the bottom 581 which the two wires 20 extend through.

The pair of bolts 70 can be columniform and securely received in the pair of fixing grooves 63. A pair of elastic latching members 80 is mounted in the pair of fixing holes 5812 and rest against the bolts 70. The latching member 80 includes a hook 83 and a limiting portion 85. A side facing the bolt 70 of the limiting portion 85 defines an arc that matches with the bolt 70.

In use, the charger unit is electrically connected by the wires and is received in the hub unit. The electronic device is set in the fitting groove and electrically connects to the charging circuit of the charger unit. The locking protrusion is received in the matching groove. The hook latches with the slot.

In the embodiment, the hub unit includes two latching members, and the charger unit correspondingly includes two slots. Alternatively, the quantities of the latching member and the slots may be changed according to different requirements.

The charger with the unit and the hub unit matched with the charger unit of the disclosure can charge an electronic device when powering the hub unit, which can lead to saving power and money.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A charger, comprising:
   a charger unit comprising an enclosure and a charging circuit received in the enclosure; the enclosure comprising a first surface, a second surface opposite to the first surface and a sidewall connected with the first surface and the second surface, the first surface defining a fitting groove for fitting an electronic device, wherein a matching groove is defined at a connection of the second surface and the sidewall, and a slot is defined in the matching groove; and
   a hub unit comprising a foundation, the foundation comprising a first side, a second side opposite to the first side, and a base side connected with the first side and the second side; and
   a circuit unit received in the foundation; and
   an antenna coupled to the circuit unit for receiving signals;
   wherein a holder for receiving the charger unit is concavely located at a connection of the base side and the second side and comprises a locking protrusion, a bolt located at a side of the locking protrusion and a latching member resting against the bolt, and two wires that are electrically coupled to the charger unit and the hub unit.

2. The charger of claim 1, wherein the matching groove comprises a floor perpendicular to the first surface, a pair of opposite first sidewalls, a second sidewall connected with the first sidewalls, each of the first sidewalls defines the slot through the sidewall of the enclosure and the floor, and the latching member is latched with the slot.

3. The charger of claim 2, wherein the floor of the matching groove defines a first through hole, the locking protrusion defines a second through hole perpendicular to the first side, and the two wires extend through the first through hole and the second through hole to electrically couple the charging unit and the circuit unit.

4. The charger of claim 1, wherein the second side of the foundation defines a jack for connecting to a power source.

5. The charger of claim 1, wherein the holder comprises a bottom parallel to the first side, a pair of first lateral wall, and the locking protrusion is located at a central section of the bottom and extends toward the first side.

6. The charger of claim 5, wherein the locking protrusion defines a fixing groove located at a side of the locking protrusion, and the slot is received in the fixing groove.

7. The charger of claim 6, wherein the fixing groove perpendicularly passes through the bottom and the locking protrusion.

8. The charger of claim 6, wherein the bottom of the holder defines a fixing hole close to the fixing groove, and the latching member is received in the fixing hole.

9. The charger of claim 8, wherein the latching member comprises a hook latched with the slot and a limiting portion resting against the bolt.

10. The charger of claim 9, wherein a side of the limiting portion facing the bolt is arc matching with the bolt.

* * * * *